3,083,139
THERAPEUTIC 1-(1,2-DIPHENYLETHYL) PYRROL-
IDINE FOR THE MANAGEMENT OF DEPRES-
SION
Brooke D. Aspergren, Kalamazoo, and Richard V. Heinzelman, Kalamazoo Township, Kalamazoo County, Mich., assignors to The Upjohn Company, Kalamazoo, Mich., a corporation of Delaware
No Drawing. Filed Dec. 17, 1959, Ser. No. 860,098
2 Claims. (Cl. 167—65)

This invention relates to compositions and a process for treatment, and more particularly to compositions of a 1(1,2-diphenylethyl)pyrrolidine as an essential active ingredient and a process for prophylactic and therapeutic treatment of humans.

The therapeutic compositions of the present invention comprise a 1(1,2-diphenylethyl)pyrrolidine as an essential active ingredient in combination with a pharmaceutically acceptable diluent or carrier. The administration of the compositions of the present invention to humans provides a method of therapy for mental diseases, such as are characterized by depression and apathy. Further the compositions are useful for treatment of premenstrual tensions, premenopausal tensions, and male climacteric.

The compositions are usefully administered to mammals such as dogs and cats for treatment of psychic depression. Additionally, the compositions can be used for non-therapeutic purposes by animal husbandmen. For example the composition can be administered to birds such as chickens for increased egg production.

The therapeutic ingredient, 1(1,2-diphenylethyl)pyrrolidine, of the present invention is a tertiary amine and can exist as the free base and can form an acid addition salt with an acid. The free base can be represented by the following formula:

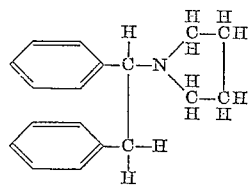

Both the free base and the acid addition salts are active. To avoid toxicity the salts of pharmacologically acceptable acids are used. Suitable salts include the hydrochloride, sulfate, phosphate, nitrate, citrate, acetate, lactate, succinate and the like. The compounds can be prepared by methods disclosed in J. Am. Chem. Soc., 75, 3409 (1953).

The compositions of the present invention are preferably presented for administration in unit dosage form as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums, and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantageous enteric coating comprises a styrene maleic acid copolymer together with known materials contributing to the enteric properties of the coating.

The liquid forms in which the novel composition of the present invention may be incorporated for administration include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for injection use.

The term unit dosage form as used in the specification and claims refers to physically discrete units sutiable as unitary dosages for human and animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in humans, as disclosed in detail in this specification, these being features of the present invention. Examples of suitable oral unit dosage forms in accord with this invention are tablets, capsules, pills, powder packets, granules, wafers, cachets, teaspoonfuls, dropperfuls, ampules, vials, segregated multiples of any of the foregoing, and other forms as herein described.

In addition to the administration of 1(1,2-diphenylethyl)pyrrolidine as the principal active ingredient of compositions for the treatment of the conditions described herein, the said compound of the novel compositions can be included with other types of compounds to obtain advantageous combinations of properties. Such combinations include 1(1,2-diphenylethyl)pyrrolidine together with sedatives such as barbital, phenobarbital, pentobarbital, mephobarbital, amobarbital, secobarbital, hexobarbital, and the like; ataractics such as prochlorperazine, meprobamate, chlorpromazine, promazine, azacyclonol, phenaglycodol, and the like; harmones such as diethylstilbestrol, testosterone, methyltestosterone, and the like; and vitamins.

The dosage of 1(1,2-diphenylethyl)pyrrolidine for treatment depends on the route of administration, age, weight, and condition of the patient. A total daily dose of from about 1 to about 500 mg. given singly or in divided doses, 1 to 5 times daily, embraces the effective range for the treatment of most conditions for which said compound is effective. The 1(1,2-diphenylethyl)pyrrolidine is compounded with a suitable pharmaceutical carrier in unit dosage form for convenient and effective administration; in the preferred embodiment of this invention, the solid unit dosage forms contain 1(1,2-diphenylethyl)pyrrolidine in amounts from about 50 to 300 mg. per unit; the fluid forms contain from about 0.1% to about 20% of 1(1,2-diphenylethyl)pyrrolidine. The dosage of compositions containing 1(1,2-diphenylethyl)pyrrolidine and one or more other active ingredients is to be determined with reference to the usual dosage of each such ingredient.

The following examples are illustrative of the compositions and process of the present invention, but are not to be construed as limiting.

EXAMPLE 1

Tablets

One thousand tablets, each containing 1 mg. of 1(1,2-diphenylethyl)pyrrolidine, are prepared from the following types and amounts of ingredients:

| | Gm. |
|---|---|
| 1(1,2-diphenylethyl)pyrrolidine | 1 |
| Lactose | 150 |
| Starch | 50 |
| Calcium stearate | 10 |
| Talc | 10 |

The finely powdered ingredients are mixed thoroughly and then tableted by a slugging procedure.

Tablets so prepared are useful in the treatment of premenstrual tension at a dose of 1 tablet every hour as needed.

Following the above procedure, tablets each containing 5 and 10 mg. of 1(1,2-diphenylethyl)pyrrolidine are prepared by increasing the amount of 1(1,2-diphenylethyl)pyrrolidine to 5 and 10 gm.

EXAMPLE 2

Tablets

To prepare 1000 tablets (50 mg.), 500 gr. of talc is added to 100 gr. of calcium stearate, and the resulting mixture is slugged together with 50 gm. of 1(1,2-diphenylethyl)pyrrolidine. The slugs are reduced to granules through a 14-mesh screen. A lactose granulation is prepared from 2400 gr. of lactose, 50 gr. of starch and 50 gr. of sucrose, the latter two constituting the granulating paste. The 1(1,2-diphenylethyl)pyrrolidine and lactose granulations are mixed, 250 gr. of talc and 100 gr. of calcium stearate are added, and the resulting mixture is compressed into tablets, each tablet containing:

| 1(1,2-diphenylethyl)pyrrolidine | mg. | 50 |
|---|---|---|
| Talc | gr. | 0.75 |
| Calcium stearate | gr. | 0.2 |
| Lactose | gr. | 2.4 |
| Starch | gr. | 0.05 |
| Sucrose | gr. | 0.05 |

The tablets so prepared are useful in the treatment of moderately severe psychotic depression in adult humans at a dosage of 1 tablet 4 times a day.

EXAMPLE 3

Tablets

One thousand tablets, each containing 100 mg. of 1(1,2-diphenylethyl)pyrrolidine and 32 mg. of amobarbital, are prepared from the following types and amounts of ingredients:

| | Gm. |
|---|---|
| 1(1,2-diphenylethyl)pyrrolidine | 100 |
| Amobarbital | 32 |
| Lactose | 50 |
| Starch | 50 |
| Calcium stearate | 10 |
| Talc | 10 |

The finely powdered ingredients are mixed thoroughly and then tableted by a slugging procedure.

The tablets so prepared are useful in the treatment of prementrual tension at a dose of 1 tablet 1 or 2 times daily.

Tablets can be similarly prepared containing barbiturates other than amobarbital. For example, tablets are similarly prepared following the above procedure and substituting for the amobarbital one of the following: phenobarbital, 32 gm.; aprobarbital, 32 gm.; pentobarbital, 32 gm.; and mephobarbital, 32 gm.

EXAMPLE 4

Hard-Gelatin Capsules

One thousand two-piece hard gelatin capsules, each containing 50 mg. of 1(1,2-diphenylethy)pyrrolidine and 50 mg. of hydroxyzine hydrochloride are prepared from the following types and amounts of ingredients:

| | Gm. |
|---|---|
| 1(1,2-diphenylethyl)pyrrolidine | 50 |
| Hydroxyzine hydrochloride | 50 |
| Lactose | 75 |
| Magnesium stearate | 25 |
| Talc | 25 |

The finely powdered ingredients are mixed thoroughly and then encapsulated in the usual manner.

The capsules so prepared are useful in the treatment of premenopausal tension at a dosage of 1 capsule 3 times daily.

Capsules can be similarly prepared containing ataractics other than hydroxyzine. For example, capsules are similarly prepared following the above procedure and substituting for the hydroxyzine one of the following: prochlorperazine dimaleate, 10 gm.; meprobamate, 200 gm.; chlorpromazine hydrochloride, 25 gm.; promazine hydrochloride, 25 gm.; azacyclonol hydrochloride, 20 gm.; and phenaglycodol, 200 gm.

EXAMPLE 5

Hard-Gelatin Capsules

One thousand two-piece hard gelatin capsules, each containing 100 mg. of 1(1,2-diphenylethyl)pyrrolidine are prepared from the following types and amounts of ingredients:

| | Gm. |
|---|---|
| 1(1,2-diphenylethyl)pyrrolidine | 100 |
| Corn starch | 75 |
| Magnesium stearate, powder | 25 |
| Talc | 25 |

The finely powdered ingredients are mixed thoroughly and then encapsulated in the usual manner.

The capsules so prepared are useful in the treatment of adult apathetic schizophrenics at a dosage of 1 capsule every 4 hours.

Following the above precedure, capsules each containing 25 and 50 mg. of 1(1,2-diphenylethyl)pyrrolidine are prepared by decreasing the amount of the 1(1,2-diphenylethyl)pyrrolidine to 25 and 50 gm.

EXAMPLE 6

Hard-Gelatin Capsules (500 Mg.)

One thousand two-piece hard gelatin capsules for oral use, each containing 500 mg. of 1(1,2-diphenylethyl)pyrrolidine, are prepared from the following types and amounts of ingredients:

| | Gm. |
|---|---|
| 1(1,2-diphenylethyl)pyrrolidine | 500 |
| Corn starch | 250 |
| Magnesium stearate, powder | 50 |
| Talc | 50 |

The finely powdered ingredients are mixed thoroughly and then encapsulated in the usual manner.

The capsules so prepared are useful in the treatment of psychoneurotic depressive states in adult humans at a dosage of 1 capsule every 6 hours.

EXAMPLE 7

Soft-Gelatin Capsules

One-piece soft gelatin capsules for oral use, each containing 250 mg. of 1(1,2-diphenylethyl)pyrrolidine, are prepared by first dispersing the compound in sufficient corn oil to render the material capsulatable and then encapsulating in the usual manner.

The capsules so prepared are useful in the treatment of psychoneurotic depressive states at a dosage of 1 capsule every 6 hours.

EXAMPLE 8

Syrup

A syrup for oral administration containing 50 mg. of 1(1,2-diphenylethyl)pyrrrolidine hydrochloride in each 5 cc. is prepared from the following types and amounts of ingredients:

|  | Gm. |
|---|---|
| 1(1,2-diphenylethyl)pyrrolidine hydrochloride | 10 |
| Ascorbic acid | 10 |
| Methylparaben | 0.75 |
| Propylparaben | 0.25 |
| Sucrose | 500 |
| Orange oil flavor | 5 |
| F. D. C. Orange dye | 2.5 |
| Deionized water q.s. ad 1000 c.c. | |

The ingredients are dissolved in sufficient water to make 1000 cc. of syrup.

The syrup as prepared is useful in the treatment of psychotic depression in children at a dose of 1 teaspoonful every 4 hours.

EXAMPLE 9

Parenteral Solution 1000 cc. of a sterile aqueous solution, each cc. containing 1 mg. of 1(1,2-diphenylethyl)pyrrolidine sulfate, is prepared from the following types and amounts of ingredients:

|  | Gm. |
|---|---|
| 1(1,2-diphenylethyl)pyrrolidine sulfate | 1 |
| Chlorobutanol | 3 |
| Water for injection q.s. ad 1000 cc. | |

The ingredients are dissolved in the water, sterilized by filtration, and filled into vials.

The solution so prepared is useful in the treatment of psychoneurotic depressive states in children when parenterally administered at a dosage of 1 cc. as required.

EXAMPLE 10

Injectable Suspension, Oil

A sterile oil preparation suitable for intramuscular injection and containing 200 mg. of 1(1,2-diphenylethyl)pyrrolidine in each ml. is prepared as follows: a mixture of 2 gm. aluminum monostearate and 98 ml. of peanut oil is slowly heated with stirring to a temperature of 100° C. The temperature is maintained at this level for one hour (when gelling is complete) and is then raised to 150° C. for one additional hour. The gel is then cooled and 20 gm of sterile 1(1,2-diphenylethyl)pyrrolidine is incorporated aseptically, with stirring, in 80 ml. of the gel. The total volume is made up to 100 ml. by addition of gel, with further stirring.

The composition so prepared is useful in the treatment of apathetic schizophrenics when parenterally administered at a dosage of 1 ml. as required.

What is claimed is:

1. A process for the treatment of depression comprising the oral administration, in unit dosage form, to a depressed human being of from about 5 to about 500 mg. of a member selected from the group consisting of 1(1,2-diphenylethyl)pyrrolidine and its pharmacologically acceptable acid addition salts in association with a solid pharmaceutical carrier.

2. A process for the treatment of depression comprising the parenteral administration to a depressed human being of a member selected from the group consisting of 1(1,2-diphenylethyl)pyrrolidine and its pharmacologically acceptable acid addition salts and a sterile vehicle, said member being in a concentration of from about 0.1% to about 20% of said vehicle.

References Cited in the file of this patent

Heinzelman: J.A.C.S., vol. 75 (1953), pp. 3409-3413.